(12) United States Patent
Izume et al.

(10) Patent No.: US 6,474,691 B2
(45) Date of Patent: Nov. 5, 2002

(54) SEAT BELT GUIDE (75) Inventors: Tomoharu Izume, Toyonaka (JP); Hiroyuki Takahashi, Aichi-ken (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/882,377

(22) Filed: Jun. 18, 2001

(65) Prior Publication Data

US 2002/0011726 A1 Jan. 31, 2002

(30) Foreign Application Priority Data

Jun. 21, 2000 (JP) .................................... 2000-185893

(51) Int. Cl.[7] .............................................. B60R 22/20
(52) U.S. Cl. ............................. 280/801.1; 280/801.2; 280/807; 297/483
(58) Field of Search ........................... 280/801.1, 801.2, 280/803, 807, 808; 297/481, 483; B60R 22/20

(56) References Cited

U.S. PATENT DOCUMENTS

| 3,145,538 A | * | 8/1964 | Radke et al. ............... 114/257 |
| 3,521,901 A | * | 7/1970 | Wackym .................. 280/801.2 |
| 3,995,885 A | * | 12/1976 | Plesniarski ................. 297/474 |
| 4,159,848 A | * | 7/1979 | Manz et al. ................ 280/804 |
| 4,236,755 A | * | 12/1980 | Pollitt et al. ............... 280/808 |
| 4,289,352 A | * | 9/1981 | Ashworth ................. 24/68 SB |
| 4,431,233 A | * | 2/1984 | Ernst ........................ 280/801.1 |
| 4,518,174 A | * | 5/1985 | Sedlmayr .................. 280/801.2 |
| 5,443,302 A | * | 8/1995 | Dybro ...................... 280/801.2 |
| 5,476,286 A | * | 12/1995 | Delfino ..................... 280/801.2 |
| 5,609,367 A | * | 3/1997 | Eusebi et al. ............. 280/801.2 |
| 5,730,499 A | * | 3/1998 | Salisbury, Jr. .............. 280/808 |
| 6,276,720 B1 | * | 8/2001 | Saito et al. ............... 280/801.2 |

FOREIGN PATENT DOCUMENTS

| GB | 2249254 A | * | 6/1992 | .......... B60R/22/00 |
| GB | 2208468 A | * | 5/1994 | .......... B60R/22/00 |
| JP | 60-147561 | | 10/1985 | |
| JP | 62-36957 | | 3/1987 | |

* cited by examiner

Primary Examiner—Brian L Johnson
Assistant Examiner—Kelly E Campbell
(74) Attorney, Agent, or Firm—Kanesaka & Takeuchi (57) ABSTRACT In a seat belt guide, a hanger for guiding a seat belt by inserting the seat belt through a belt passing opening is inserted into a hanger guiding portion of a main portion to be moved in a front-to-rear direction. When the hanger is slid forwards by a predetermined distance, a rear end of a sliding groove of the hanger engages with a bolt to thereby swing the hanger in a horizontal direction. Since the seat belt is urged by a spring to a side opposite to a direction in which the seat belt is taken out of the belt passing opening when the seat belt is attached to a passenger, even if the passenger of small build wears the seat belt, the seat belt is not wound round the shoulder of the passenger and the seat belt adjusted to a lower attaching height can be attached to a proper position.

6 Claims, 12 Drawing Sheets

SEAT BELT GUIDE

BACKGROUND OF THE INVENTION AND RELATED ART STATEMENT

This invention relates to a seat belt guide, more particularly, a seat belt guide wherein an attaching position of a seat belt can be adjusted.

Heretofore, in a rear seat of an automobile, there has been known a seat belt guide wherein a seat belt withdrawn from a retractor is guided.

Figure 12:
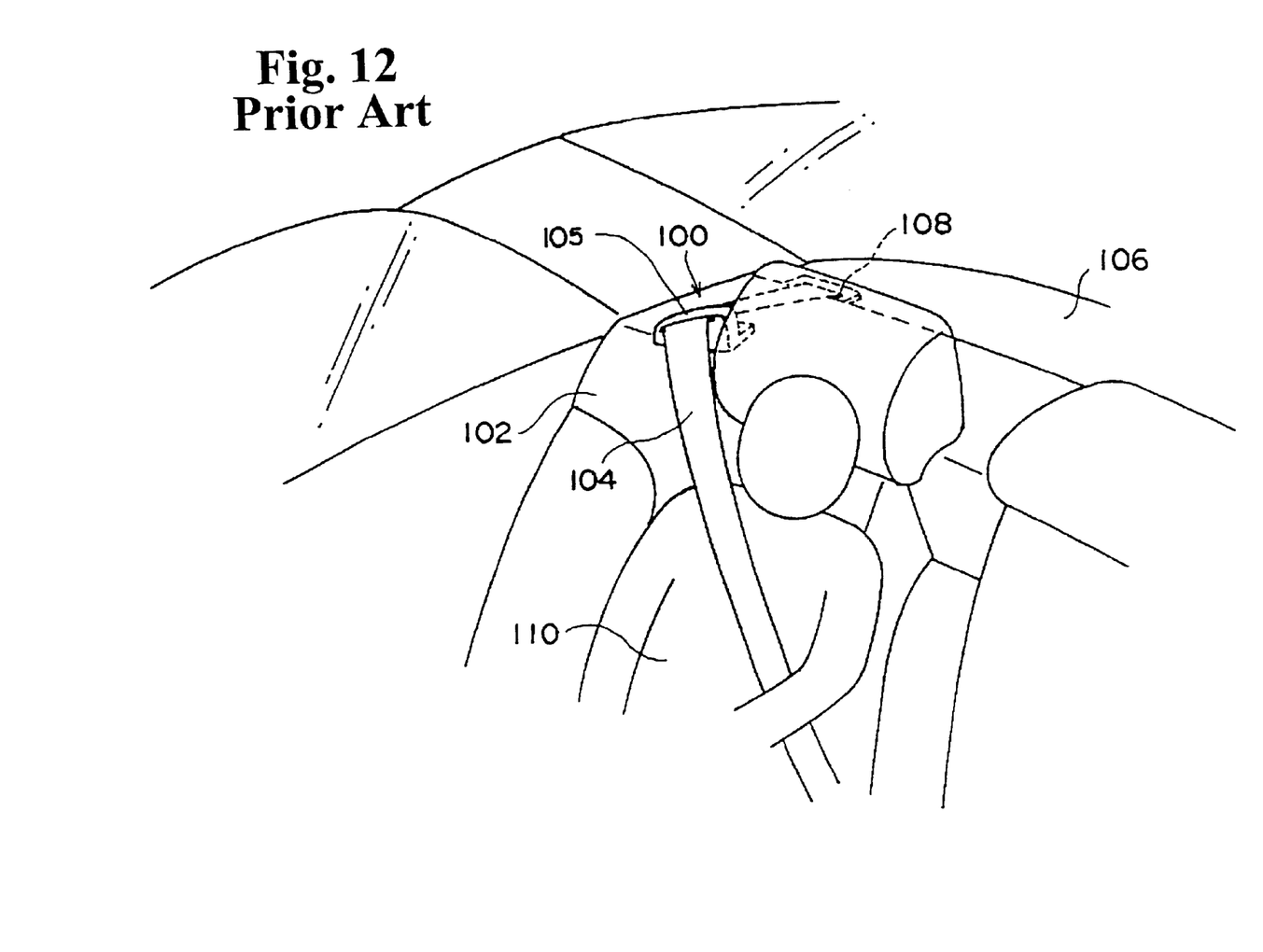
FIG. 12 is a perspective view illustrating a seat belt guided by a conventional seat belt guide employed to restrain a passenger of small build.

For example, a conventional seat belt guide 100, as shown in FIG. 12, is disposed at an upper portion (in the drawing, a position near an outside of the automobile at an upper portion) of a seat back of a rear seat 102. A seat belt 104 is fed into a passenger compartment through an opening 108 of a package tray 106 from a retractor (not shown) disposed in the rear of the rear seat 102, and inserted into a guiding slot of a guiding portion 105 provided at a front end of the seat belt guide 100. Thus, the seat belt 104 is held at a predetermined position guided by the seat belt guide 100.

However, since the conventional seat belt guide 100 is fixed to the rear seat 102, a guiding position of the seat belt 104 can not be changed. Therefore, in case a passenger 110 of small stature or build, such as an aged person or child as shown in the drawing, wears the seat belt 104, an attaching position of the seat belt 104 is relatively shifted upward, and the seat belt 104 may not be properly positioned. Therefore, there has been a problem making it necessary for the passenger to use a cushion or the like to adjust the height of the attaching position.

In view of the above problem, the present invention has been made and an object of the invention is to provide a seat belt guide, wherein the attaching position of the seat belt can be adjusted, and the seat belt can be properly applied to the passenger according to the build of the passenger.

Further objects and advantages of the invention will be apparent from the following description of the invention.

SUMMARY OF THE INVENTION

According to a first aspect of the invention, a seat belt guide for guiding a seat belt, in the vicinity of a passenger's shoulder, fed out of a retractor disposed at a rear side of a seat and obliquely attached to restrain an upper half of a passenger seated on the seat, includes a moving guide device for moving a guiding position of the seat belt in a front-to-rear direction.

In the first aspect of the invention, the seat belt fed out of the rear side of the seat is attached to restrain the passenger by obliquely crossing the upper half and over one shoulder of the passenger seated on the seat. The seat belt guide guides the seat belt across the passenger in the vicinity of the shoulder. In case the seat belt guide shifts the guiding position of the seat belt forward relative to the seat by the moving device, a winding angle of the seat belt wound around the shoulder of the passenger becomes shallow, so that an overlapping quantity becomes small. Thus, a tightening force of the seat belt applied to the shoulder portion is reduced or is released, so that the seat belt is extended to a waist side across a chest portion of the passenger.

Therefore, even if a passenger of small build wears the seat belt, the seat belt is not wound tightly around or in the vicinity of his shoulder more than necessity, so that without relatively changing a height for attaching the seat belt, the seat belt can be properly applied to the passenger.

According to a second aspect of the invention, in the seat belt guide as described in the first aspect, a main portion of the seat belt guide mounted to the seat or a rear tray is provided with an opening at a front end surface thereof and an inserting portion formed in an approximately hollow shape or portion extending from the opening to a rear side. The moving device is formed of a sliding member to be inserted into the inserting portion to be slid in a front-to-rear direction, and a guiding portion disposed at a front end of the sliding member and provided with a seat belt inserting opening for guiding the seat belt threrethrough.

In the invention according to the second aspect, the main portion of the seat belt guide is mounted to the seat or the rear tray, and the sliding member is inserted into the inserting portion of the main portion. Since the inserting portion includes the opening at the front end surface of the main portion to be formed in the approximately hollow shape portion extending from the opening to the rear side, the inserted sliding member is guided through the inserting portion to thereby slide in the front-to-rear direction relative to the seat.

Then, a guiding position of the seat belt can be moved by forming a guiding portion provided with the inserting opening at the front end of the sliding member and inserting the seat belt into the inserting opening.

As described above, the moving device for moving the guiding position of the seat belt is materialized by the sliding member for sliding in the front-to-rear direction of the seat and the guiding portion provided to the front end of the sliding member, so that the moving device can be produced small at a low cost without using mechanical and electrical devices.

According to a third aspect of the invention, in the seat belt guide as described in the second aspect, the inserting portion is provided with a first engaging portion and the sliding member is provided with a second engaging portion to be engaged with the first engaging portion at a position where the sliding member is slid forward by a predetermined distance.

In the invention as described in the third aspect, when the sliding member is slid forward by a predetermined distance, the second engaging portion of the sliding member is engaged with the first engaging portion provided to the inserting portion to be held at the position. Thus, a desired guiding state can be obtained without providing a fastening device or the like for fixing the sliding member, which is slid forward, at the position, with a simple structure.

According to a fourth aspect of the invention, the seat belt guide as described in the second and third aspects includes a supporting shaft provided in the inserting portion and extending at right angles with respective to the sliding direction of the sliding member; an engaging portion provided at a rear end of the sliding member to be engaged with the supporting shaft at the position where the sliding member is slid forward by the predetermined distance to thereby allow the sliding member to be swung around the supporting shaft; and a resilient urging device for urging the swingable sliding member to a side approximately opposite to the direction in which the seat belt to be attached to the passenger is taken out of the inserting opening at least in a state that the sliding member is slid forward.

In the fourth aspect of the invention, when the sliding member is slid forward by the predetermined distance, the engaging portion disposed at the rear end of the sliding member is engaged with the supporting shaft of the inserting portion. The supporting shaft is disposed at right angles to the sliding direction of the sliding member, and the sliding member engaged with the supporting shaft at the engaging portion thereof can be swung in the horizontal direction around the supporting shaft as a pivot. The swingable sliding member is urged by the urging device in the approximately opposite side to the direction in which the seat belt is taken out of the inserting opening when the seat belt is attached at least in the state where the sliding member is slid forward. "The approximately opposite side" means a direction opposite to the seat-belt-taken-out direction in a moving direction, i.e. horizontal direction, of the sliding member swingable in the horizontal direction.

As described above, since the sliding member which has been slid forward is urged to the approximately opposite side to the direction in which the seat belt is taken out to swing when the seat belt is attached, the guiding position appears to be moved outward when viewed by the passenger who wears the seat belt, so that the attaching position of seat belt is relatively lowered. Therefore, the seat belt, attaching height of which is lowered, can be attached to a proper position of the passenger of small build.

Also, even if the seat belt is taken out vigorously when the seat belt is attached, since the sliding member is swung in the taken-out direction of the same, forces applied to the sliding member itself, engaging portion or supporting shaft of the main portion are absorbed to thereby prevent them from being broken. After attachment of the seat belt, the sliding member is urged outward by the urging device to move the guiding position, so that an attaching state suitable for the passenger of small build as described above can be obtained.

DETAILED DESCRIPTION OF THE PREFERRED EMBODIMENT

Hereunder, an embodiment of the present invention is explained with reference to the accompanying drawings.

Figure 1:
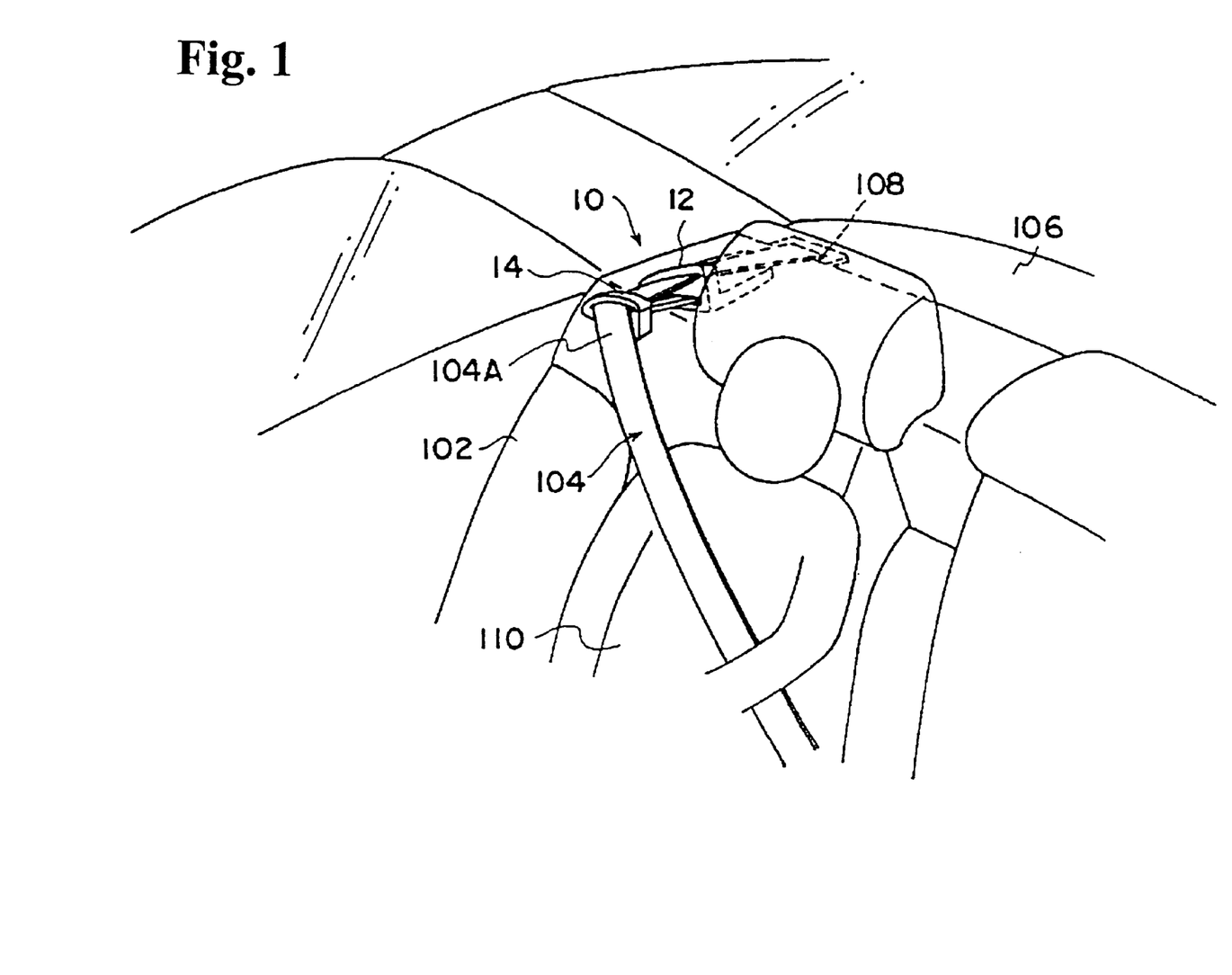
FIG. 1 is a perspective view of the seat belt guide embodying the invention applied to restrain a passenger of small build.

FIG. 1 shows a rear seat portion of a car to which a seat belt guide of an embodiment according to the present invention is applied. As shown in the drawing, in the same manner as in a conventional seat belt guide, a seat belt guide 10 of the invention is disposed on an upper portion of a seat back of a rear seat 102 to guide an upper end portion 104A of a seat belt 104 withdrawn from an opening 108 of a package tray 106.

The seat belt guide 10 includes a main portion 12 attached mainly to the rear seat 102, and a hanger 14 attached to the main portion 12 to be slidable in a front-to-rear direction of the rear seat 102 and to be swingable in a horizontal (side-to-side) direction in its forward position to thereby control a guiding position of the seat belt 104.

FIG. 1 shows a state wherein a passenger 110 of small build wears the seat belt 104. The seat belt guide 10 allows the hanger 14 to slide forward and swing leftward in the drawing, i.e. laterally of the car, to change the guiding position of the upper end portion 104A. Therefore, a position to which the seat belt 104 is attached is lowered and, at the same time, an angle with which the seat belt 104 is wound round a passenger's shoulder becomes shallow, so that the passenger 110 can wear the seat belt 104 at a position suitable for his build. Hereunder, a structure of the seat belt guide 10 for controlling the guiding position of the seat belt 104 as described above is explained.

Figure 2:
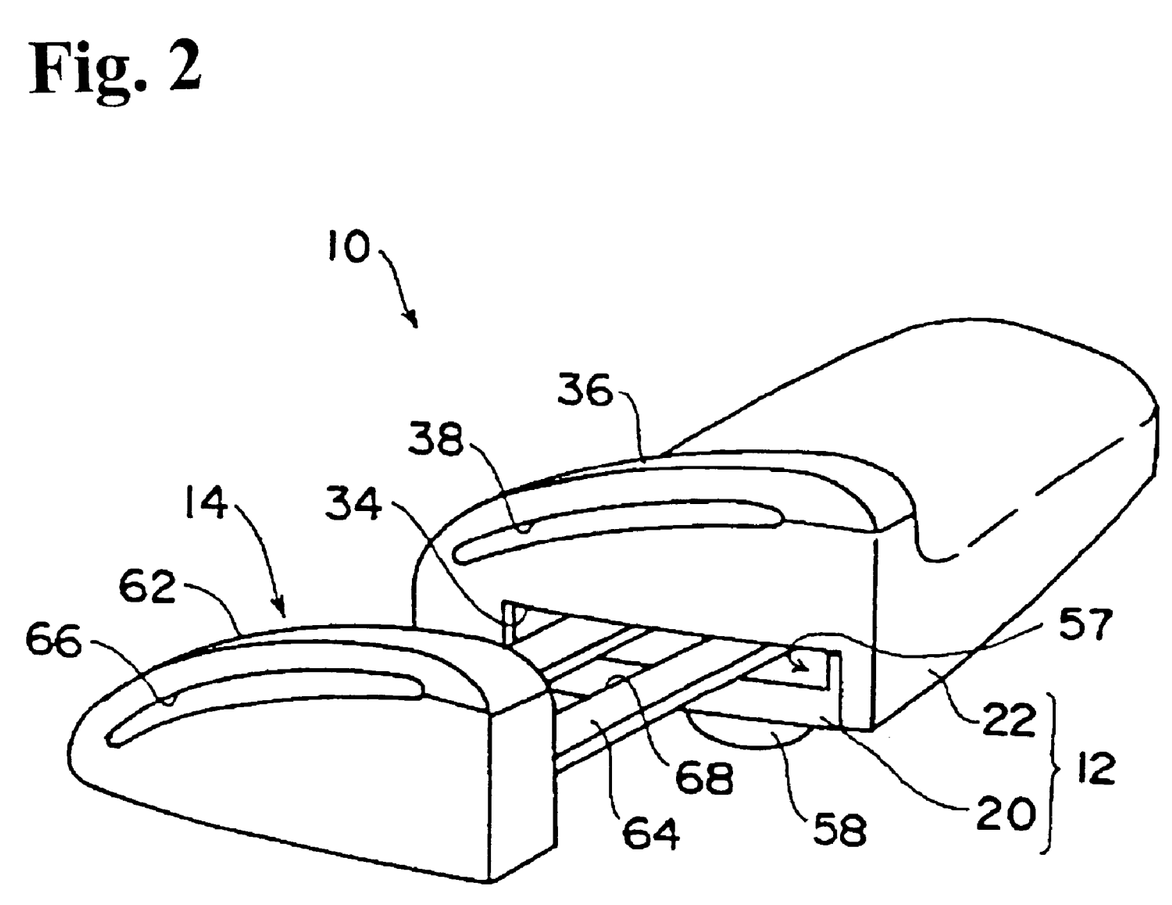
FIG. 2 is a perspective view showing a hanger of a seat belt guide of an embodiment according to the invention in a forward position.
Figure 3:
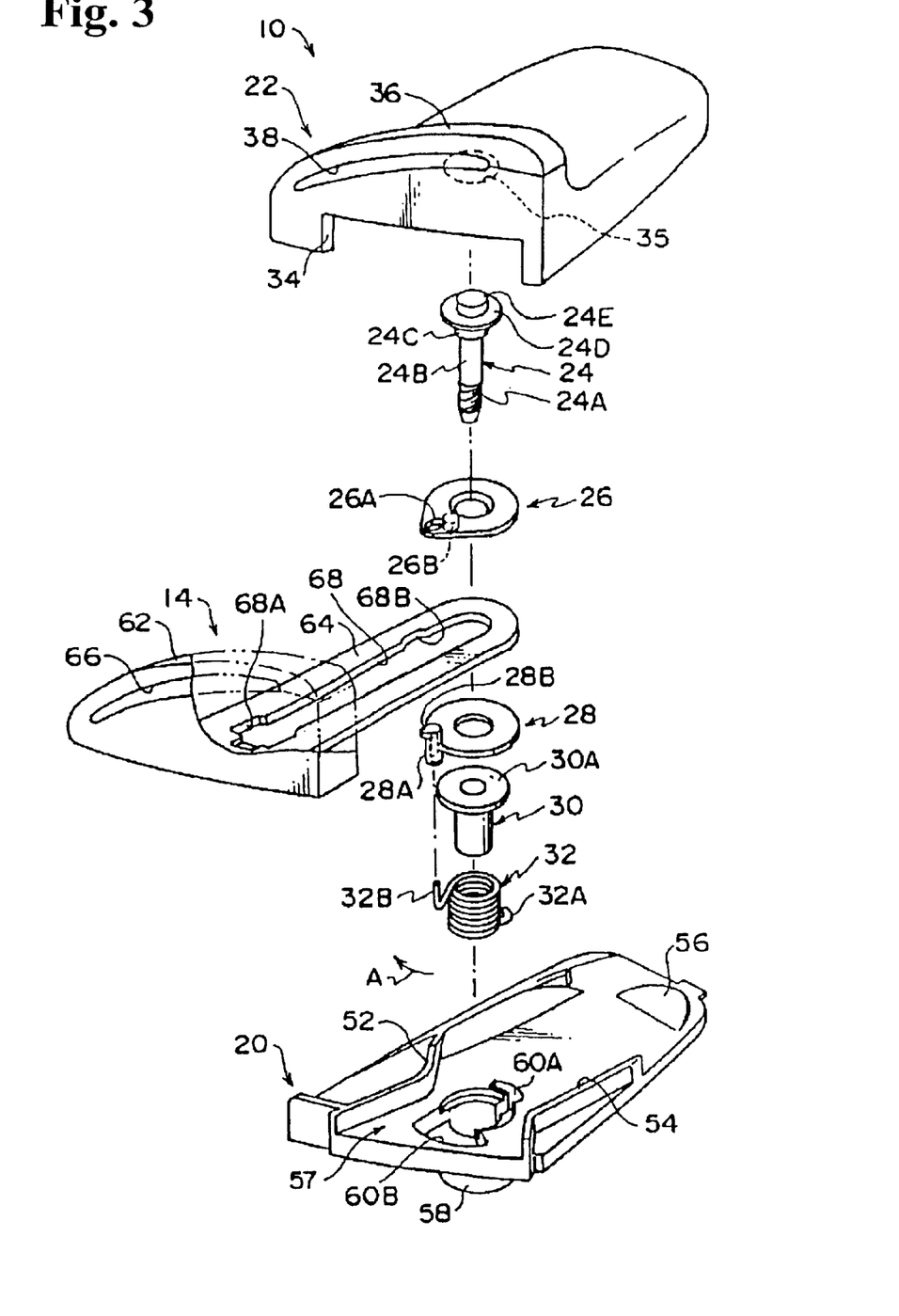
FIG. 3 is an exploded perspective view of the seat belt guide shown in FIG. 2.

FIGS. 2 and 3 show a perspective view and an exploded perspective view, respectively, of the seat belt guide 10. As shown in the drawings, the main portion 12 includes a lower cover or base 20 (a molded product of POM) having an approximately trapezoidal plate shape and disposed at a lower side, and an upper cover or body 22 (a molded product of POM) attached to an upper surface of the lower cover 20 to cover the same. Further, in the main portion 12 having such a separated structure, there are assembled a bolt 24, upper spring guide 26, lower spring guide 28, spacer 30 and spring 32 for swingably holding the hanger 14 and urging the same in a predetermined direction.

The upper cover 22 includes a rectangular opening 34 at a lower edge of a front end surface, and an upwardly projecting guiding portion 36 at the front end to guide the seat belt 104. Also, a circular opening 35 is provided at a location rearwardly of the guiding portion 36.

The guiding portion 36 has a belt inserting opening 38 inclined in a predetermined direction (in the drawing, downwardly inclined toward a left side) and penetrated in the front-to-rear direction, so that the seat belt 104 may be inserted into the belt inserting opening 38.

Figure 4A:
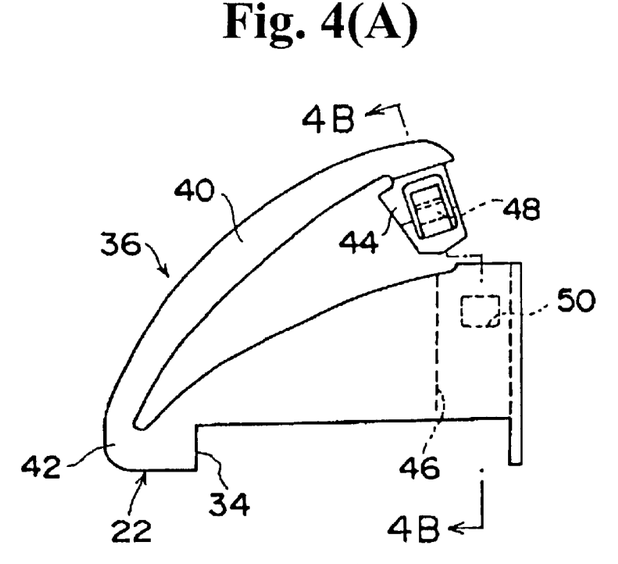
FIG. 4(A) is an elevation view showing the seat belt guide portion of the seat belt guide assembly shown in FIG. 2.
Figure 4B:
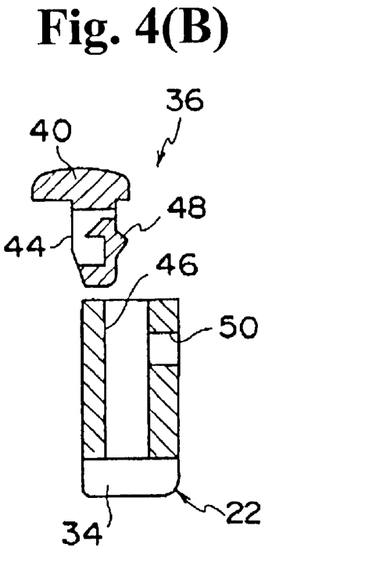
FIG. 4(B) is a sectional view taken along line 4B—4B in FIG. 4(A)
Figure 4C:
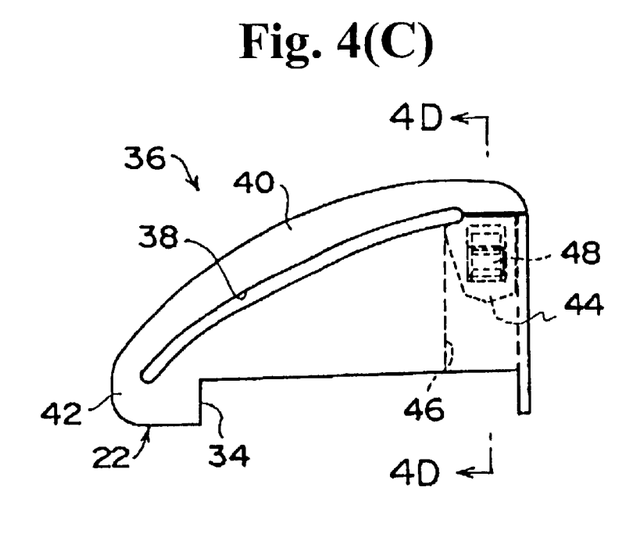
FIG. 4(C) is a drawing showing an assembled state of the guide portion shown in FIG. 2.
Figure 4D:
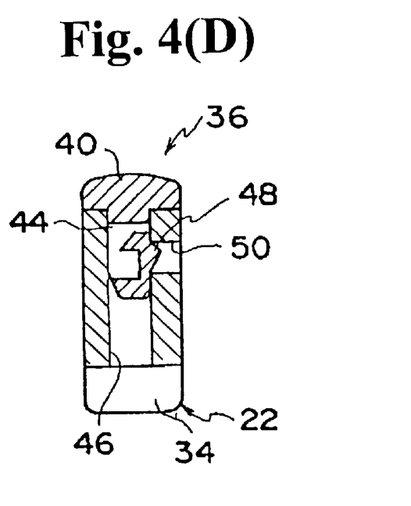
FIG. 4(D) is a sectional view taken along line 4D—4D in FIG. 4(C)

FIGS. 4(A) to 4(D) are diagrams illustrating a structure of the guiding portion 36. FIGS. 4(A) and 4(B) show the shape of the guiding portion 36 as it is molded. As shown in the drawings, the guiding portion 36 includes a structure defining the belt inserting opening 38, and is separated into upper and lower portions, including an upper wall or arm 40 connected to the upper cover 22 at an inclined lower side hinged end 42. The arm 40 is spaced from and cooperates with cover 22 to define the belt inserting opening 38. A projecting member 44 on the arm 40 cooperates with a penetrating hole 46, as shown in FIGS. 4(C) and 4(D), and an engaging claw 48 provided to the projecting member 44 is elastically deformed to engage with a detent or hole 50 in the penetrating hole 46 and locked therein to thereby form the belt inserting opening 38. Thus, since the guiding portion 36 may be opened, the seat belt 104 can be easily set into the belt inserting opening 38.

Also, as shown in FIG. 4(B), in a natural state right after the molding, positions of the projecting member 44 and the penetrating hole 46 are offset, i.e. the projecting member 44 is positioned at one side with respect to the penetrating hole 46. Thus, when the projecting member 44 is inserted into the penetrating hole 46, the inclined lower side hinged end 42 is deformed so that the restoring force of the same is applied to the inserting portion to thereby strengthen a locking force.

On the other hand, as shown in FIG. 3, the lower cover 20 includes generally opposing walls 52, 54 extending in a front-to-rear direction near both ends of an upper surface thereof, and an inclined cam portion 56 having a surface upwardly inclined toward a rear direction and positioned near a rear end of the upper surface.

Front sides of the walls 52, 54 diverge from one another to form a tapered shape opened at the front edges and, when the upper cover 22 is attached, the walls 52, 54 fit between inner wall surfaces of the opening 34. Thus, in an assembled state as shown in FIG. 2, a hanger guiding portion 57 of an approximately tube shape surrounded by the opening 34 as an entrance, the upper surface of the lower cover 20, wall portions 52, 54 and upper cover 22 is formed to thereby communicate with an interior of the main portion 12.

Figure 5:
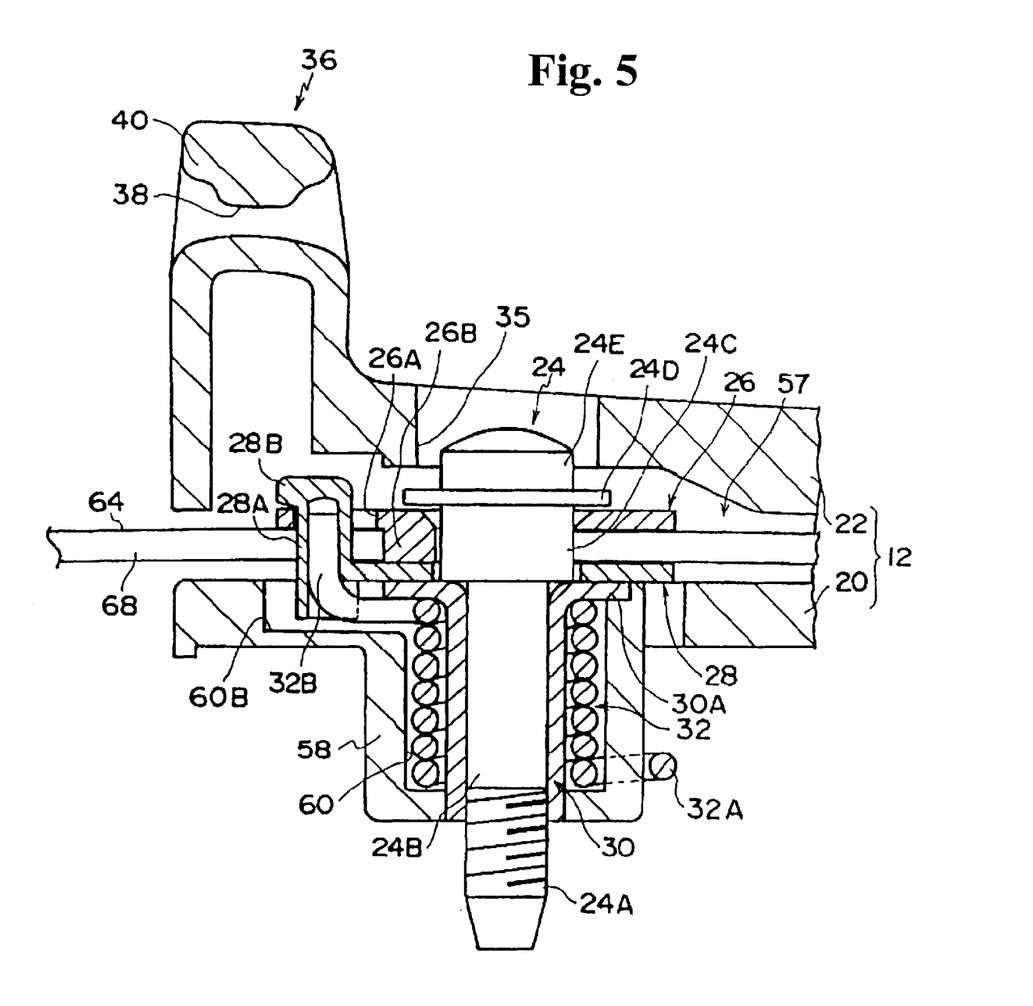
FIG. 5 is an enlarged sectional view of a holding mechanism of the hanger in the seat belt guide shown in FIG. 2.

Further, a substantially cylindrical boss 58 is disposed in the vicinity of a front end of the lower cover 20 and projects downward and, as shown in FIG. 5, the spring 32 is fitted in a concaved portion 60 of the boss 58. The spring 32 is disposed such that a fixing end 32A thereof is fitted in a retaining groove 60A formed on a rear end side of the concaved portion 60, and a movable end 32B is placed on a step 60B in an approximately fan shape indented on a front end side of the concaved portion 60, so that the movable end 32B is movable in a predetermined area.

A cylindrical spacer 30 having a flange 30A at an upper end thereof is inserted into the spring 32, and further an approximately annular shape lower spring guide 28 larger than the flange 30A is disposed on an upper portion of the spacer 30.

The lower spring guide 28 is provided with a cylindrical pin portion 28A directed in an axial direction, i.e. vertical direction, at an outer peripheral edge thereof, so that the movable portion 32B of the spring 32 is inserted into the same, and an outwardly projecting claw portion 28B is formed at an upper end of the cylindrical portion 28A. On an upper side of the lower spring guide 28, an annular shaped upper spring guide 26 having substantially the same size as that of the lower spring guide 28 is disposed through the hanger 14.

The hanger 14 is preferably a molded product of POM, and a forward end thereof constitutes an upstanding guiding portion 62 for guiding the seat belt 104. Also, a sliding portion 64 is extended rearward from a lower end of a back surface of the guiding portion 62.

The guiding portion 62 is provided with a belt receiving opening 66 wherein the opening is inclined in a predetermined direction and penetrated in the front-to-rear direction, in the same manner as in the guiding portion 36 on the side of the main portion 12, so that the seat belt 104 is guided through the belt passing opening 66. The guiding portion 62 is also separated into upper and lower portions as explained with respect to the guiding portion 36 referring to FIG. 4, so that the seat belt 104 can be easily set.

The sliding portion 64 is a generally plate-like member extending in a front-to-rear direction and is dimensioned to be received into the hanger guiding portion 57. In order to reinforce the strength of the sliding portion 64, an SUS material is inserted therein. Also, an elongated sliding groove 68 of a predetermined length is provided along a central portion of the sliding portion 64.

In the assembled state of the main portion 12 and the hanger 14 having the above structure, the cylindrical portion 28A of the lower spring guide 28 penetrates the sliding groove 68 of the sliding portion 64 and urges the sliding portion 64 in an arrow direction A, in FIG. 3 of the drawings, by a biasing force of the spring 32. Also, the claw portion 28B engages with a through hole 26A of the upper spring guide 26 disposed on an upper side of the sliding portion 64 to thereby interlock the upper spring guide 26.

A boss 26B having a height slightly greater than the thickness of the sliding portion 64 is projected from a lower surface of the upper spring guide 26 in the vicinity of the through hole 26A. The boss 26B penetrates the sliding groove 68 in a state wherein the respective members are assembled to the main portion 12 and abuts against the lower spring guide 28. Thus, a predetermined space is formed between the upper spring guide 26 and the lower spring guide 28 superposed on each other through the sliding portion 64 to thereby allow the sliding portion 64 to smoothly move.

Also, depressed portions 68A, 68B are formed to predetermined positions of a forward end and on a rear end side of the sliding groove 68 by depressing the groove wall surface, so that when the hanger 14 reaches the predetermined position of the forward end or on the rear end side, the cylindrical portion 28A engages with the depressed portion 68A or 68B.

Then, the bolt 24 penetrating through these elements is formed of a forward end screw portion 24A, a small diameter portion 24B, a large diameter portion 24C, a flange 24D and a head 24E in this order from a forward end side thereof. In an assembled state as shown in FIG. 5, the screw portion 24A and the small diameter portion 24B penetrate through the spacer 30, so that a part of the screw portion 24A is projected from a lower end surface of the boss 58 to fit a mounting screw hole (not shown) on a side of the rear seat 102.

The large diameter portion 24C abuts against the flange 30A of the spacer 30 and, at the same time, penetrates through the lower spring guide 28, the sliding groove 68 of the sliding portion 64 and the upper spring guide 26 to rotatably support the same, and the respective members are pressed by the flange 24D to provide a stable assembly. Further, the head 24E is disposed in the round hole 35 of the upper cover 22 so that an upper surface thereof is exposed from the round hole.

Next, operations of the embodiment are explained. FIGS. 6 through 11 show a manner for changing a guiding position of the seat belt 104 by sliding the hanger 14 of the seat belt guide 10.

Figure 6:
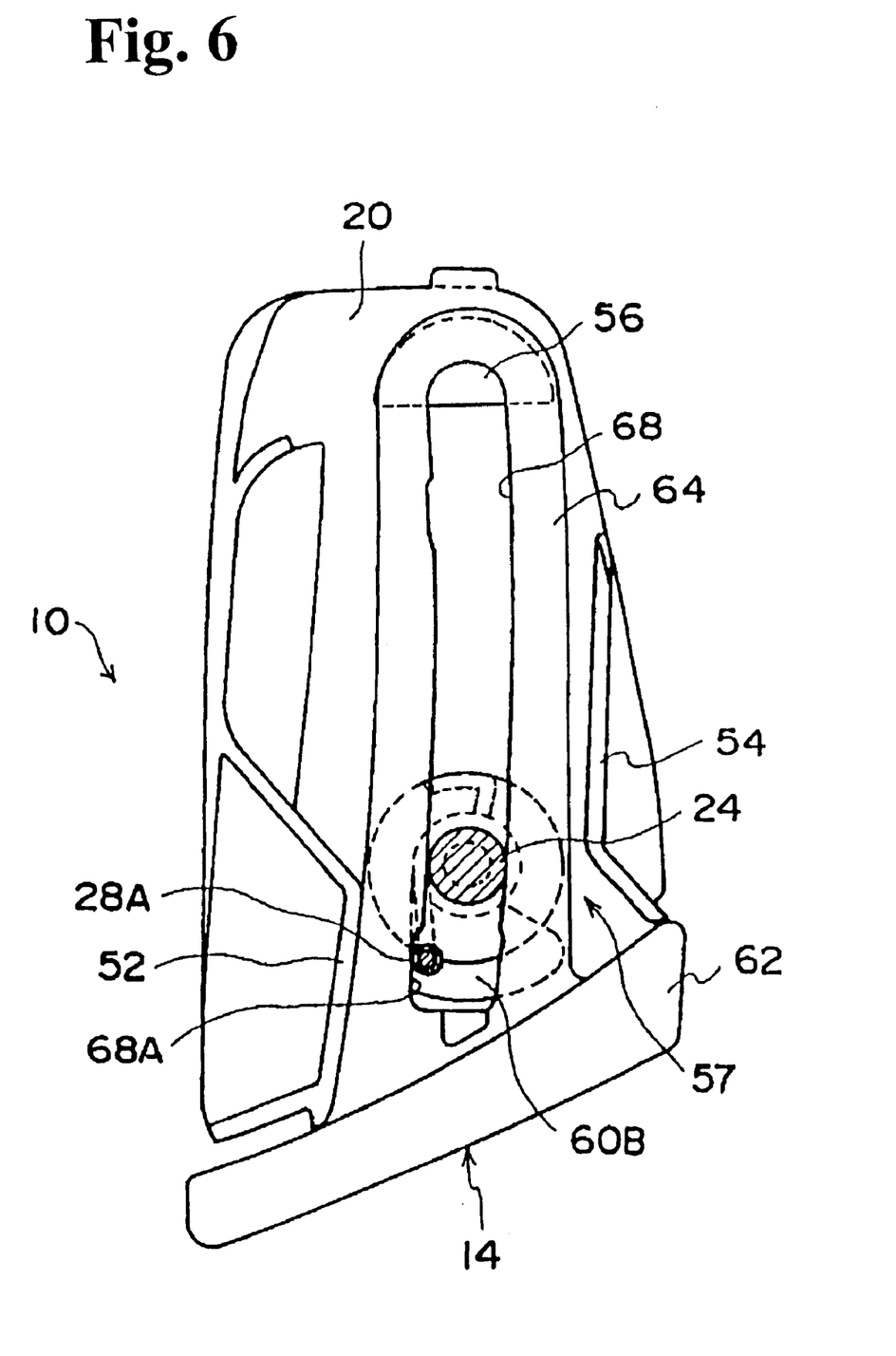
FIG. 6 is a plan sectional view for illustrating the manner in which a guiding position of the seat belt is changed by a sliding movement of the hanger, wherein the hanger is slid rearward.
Figure 7:
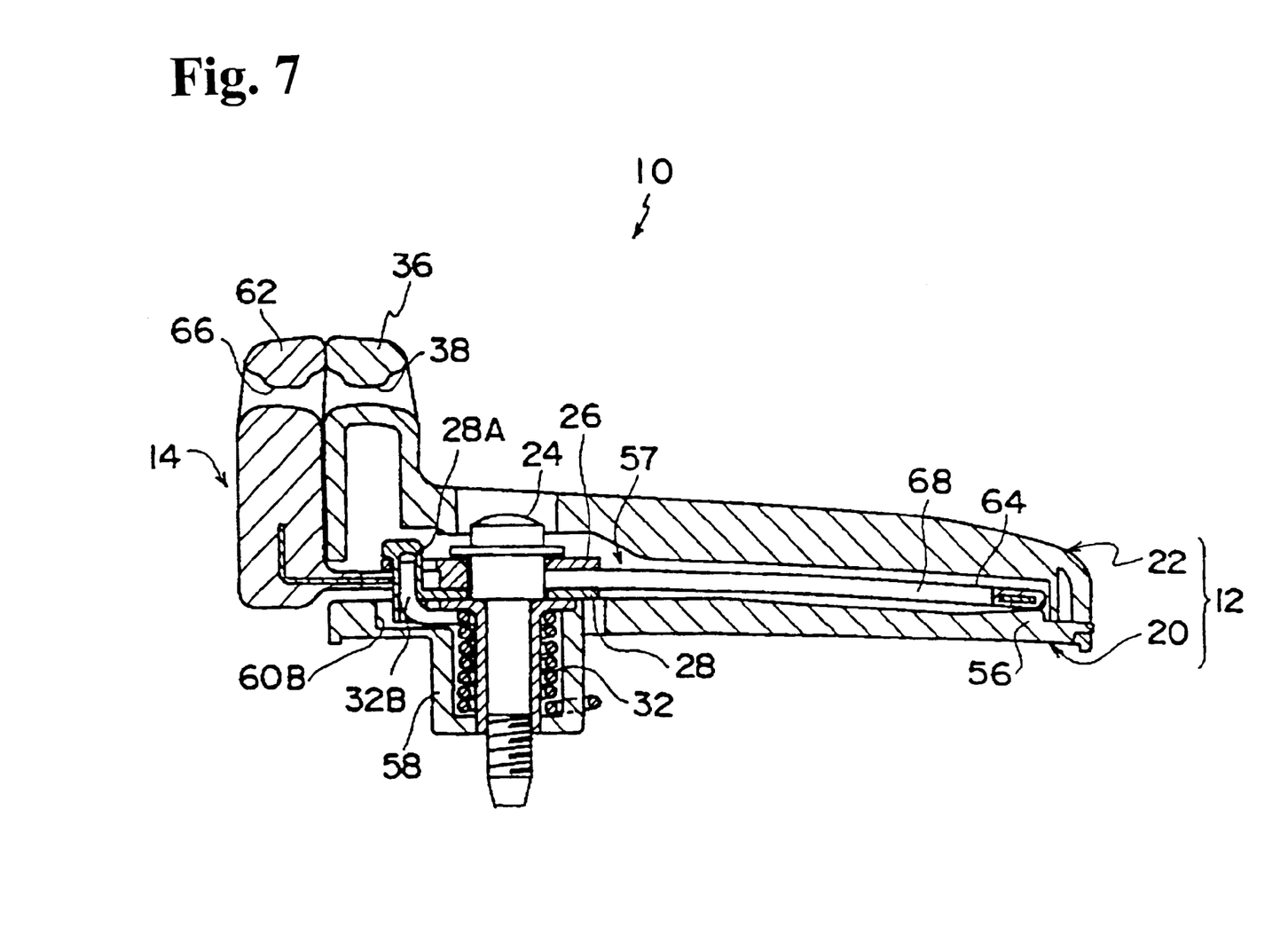
FIG. 7 is a sectional view of the structure shown in FIG. 6.

FIGS. 6 and 7 show a case wherein the seat belt guide 10 is used in the same manner as in the conventional seat belt guide. The guiding portion 62 of the hanger 14 is pushed in to thereby abut against the guiding portion 36 of the main portion 12. In this state, the sliding portion 64 is housed in the hanger guiding portion 57 of the main portion 12 and, at the same time, the rear end of the sliding portion 64 runs on the inclined cam portion 56 to generate a friction force. Also, the cylindrical portion 28A urged by the spring 32 engages with the depressed portion 68A formed at the forward end of the sliding groove 68.

Thus, the hanger 14 is releasably held at the position and is not easily slid forward, so that the seat belt 104 passed through the belt receiving opening 66 is guided at substantially the same position as that of the conventional seat belt.

Figure 8:
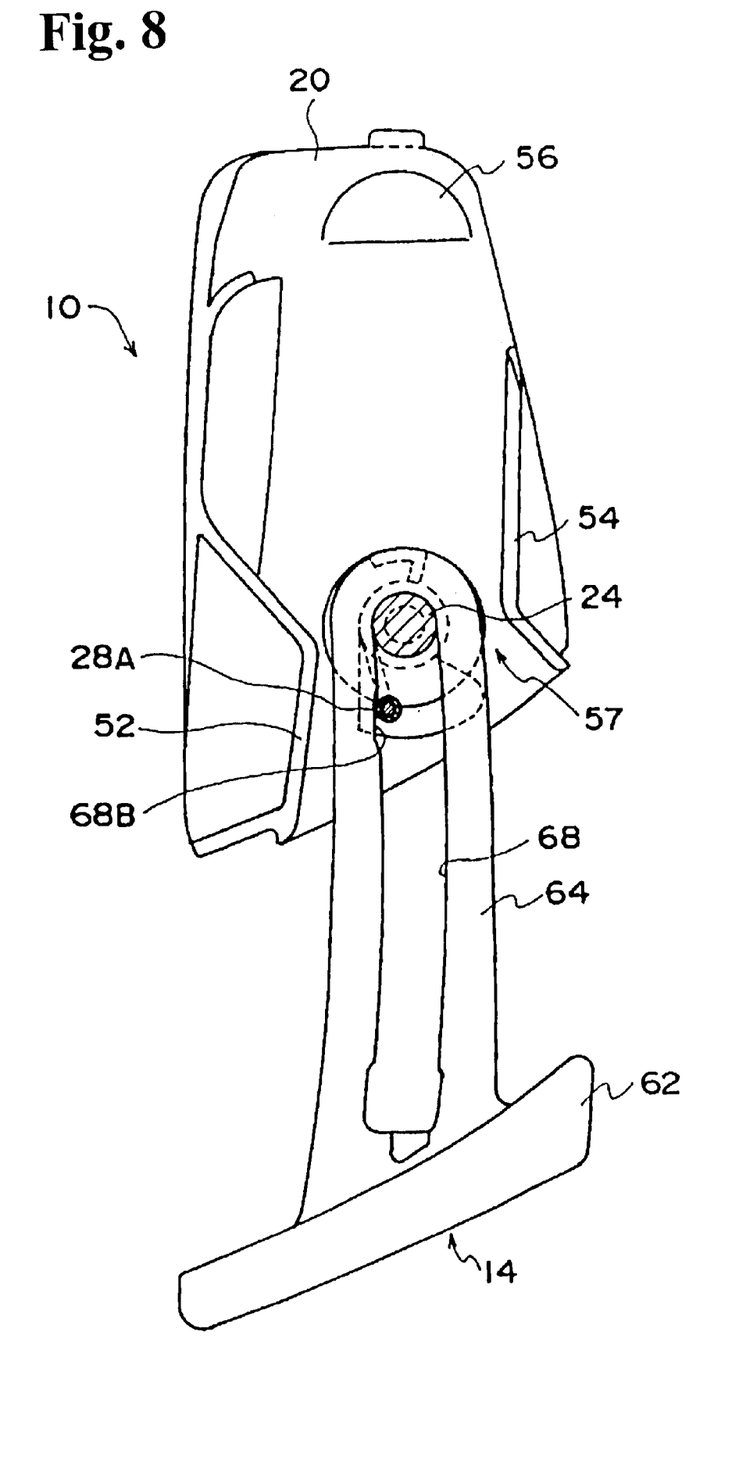
FIG. 8 is a plan sectional view illustrating the manner in which the guiding position of the seat belt is changed by the sliding movement of the hanger, wherein the hanger is slid forward.
Figure 9:
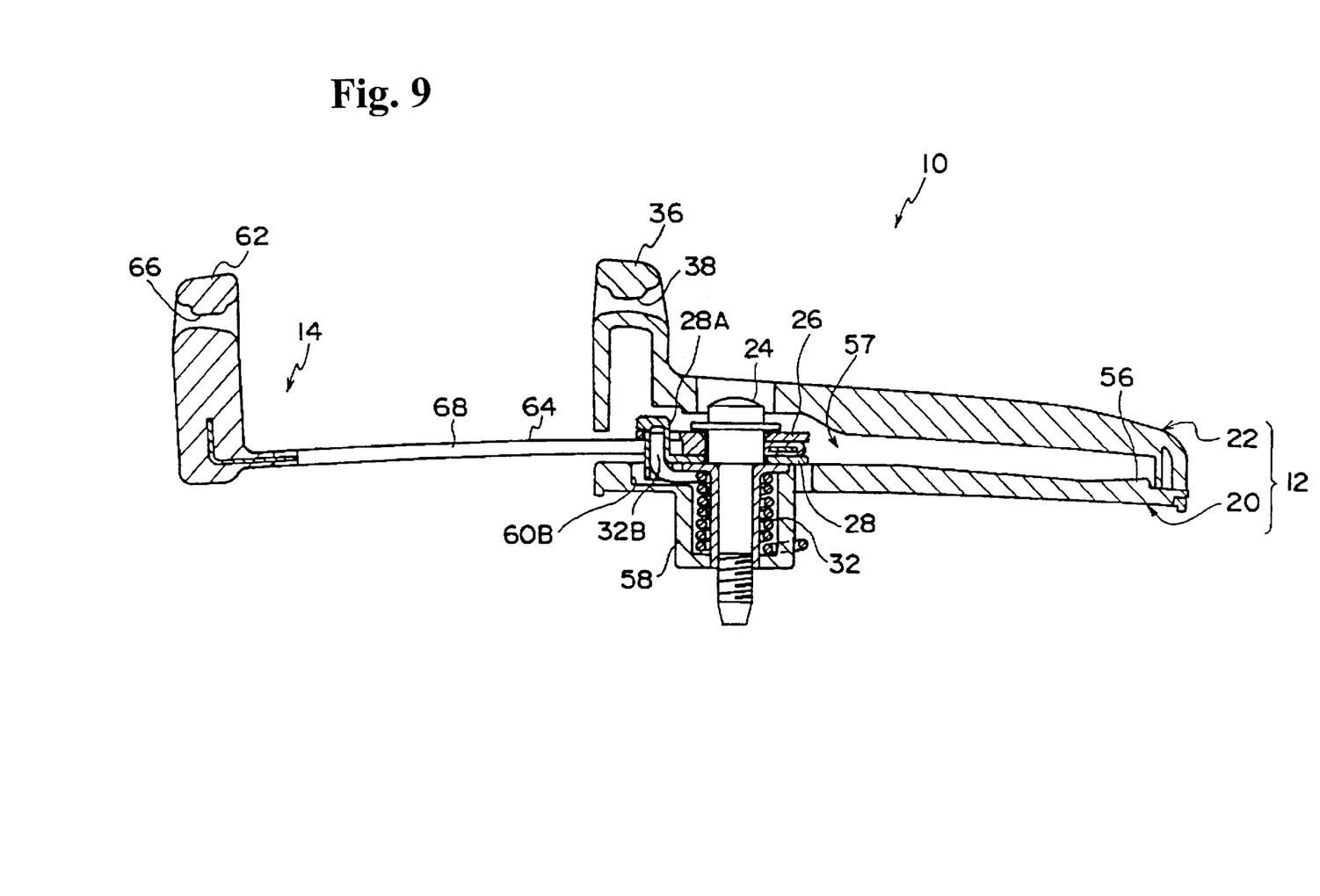
FIG. 9 is a sectional view of the structure shown in FIG. 8.

When the hanger 14 is displaced from this position, the sliding portion 64 is slid forward in the hanger guiding portion 57 while the sliding groove 68 is being guided by the bolt 24. Then, when the rear end of the sliding groove 68 reaches a position where the rear end abuts against the bolt 24 as shown in FIGS. 8 and 9, the cylindrical portion 28A engages with the depressed portion 68B located on the rear end side of the sliding groove 68 to thereby releasably lock the hanger 14.

Figure 10:
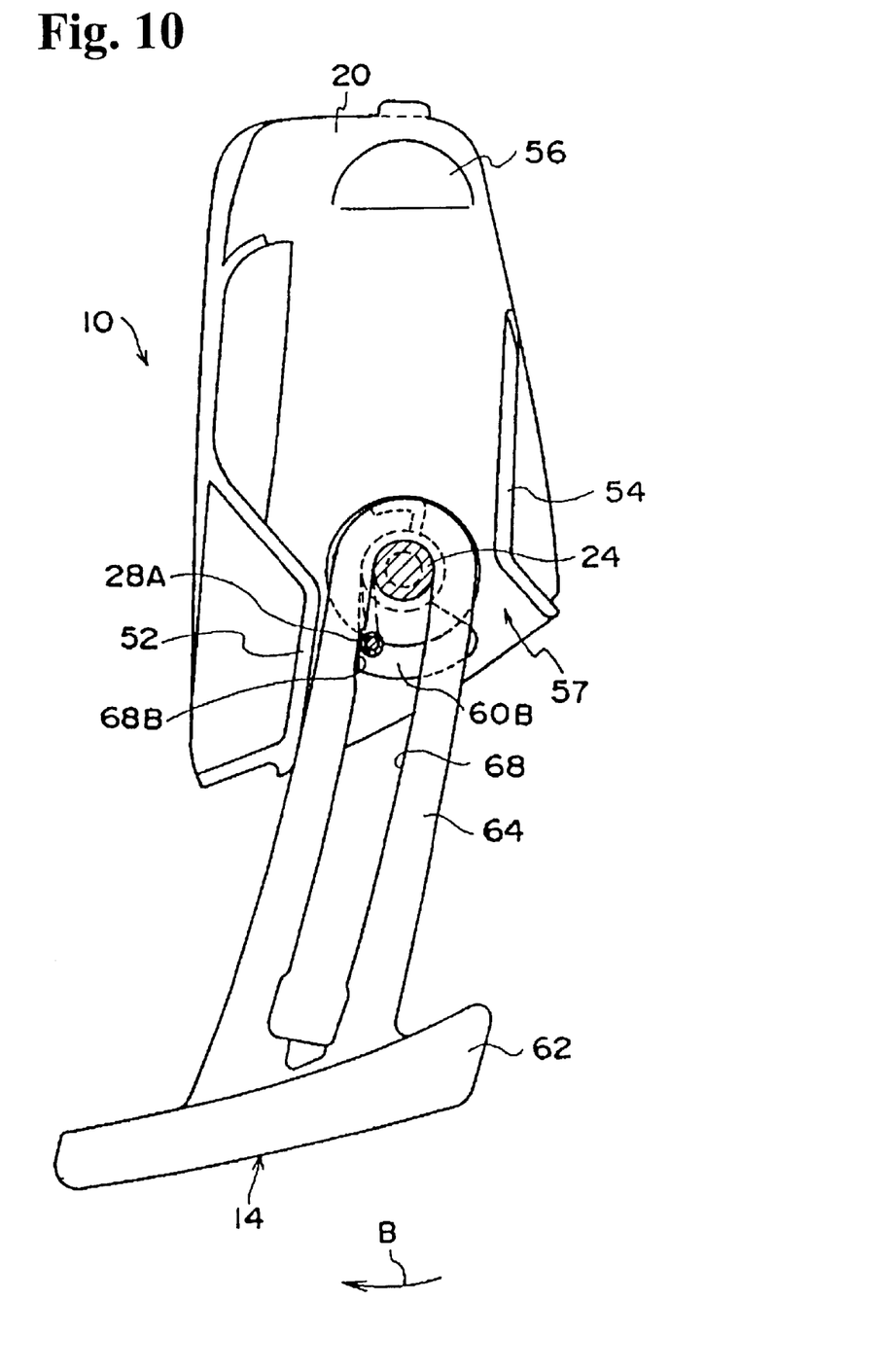
FIG. 10 is a plan sectional view illustrating the manner in which the guiding position of the seat belt is changed by the sliding movement of the hanger, wherein the hanger is slid forward and swung by being urged in a predetermined direction.

At this time, in case a passenger releases the hanger 14, the hanger 14 urged by the spring 32 is swung in the direction indicated by arrow B as shown in FIG. 10, and the sliding portion 64 is retained at a position where the sliding portion 64 abuts against the wall 52. Thus, the guiding position of the seat belt 104 is changed to the position as shown in FIG. 1.

Figure 11:
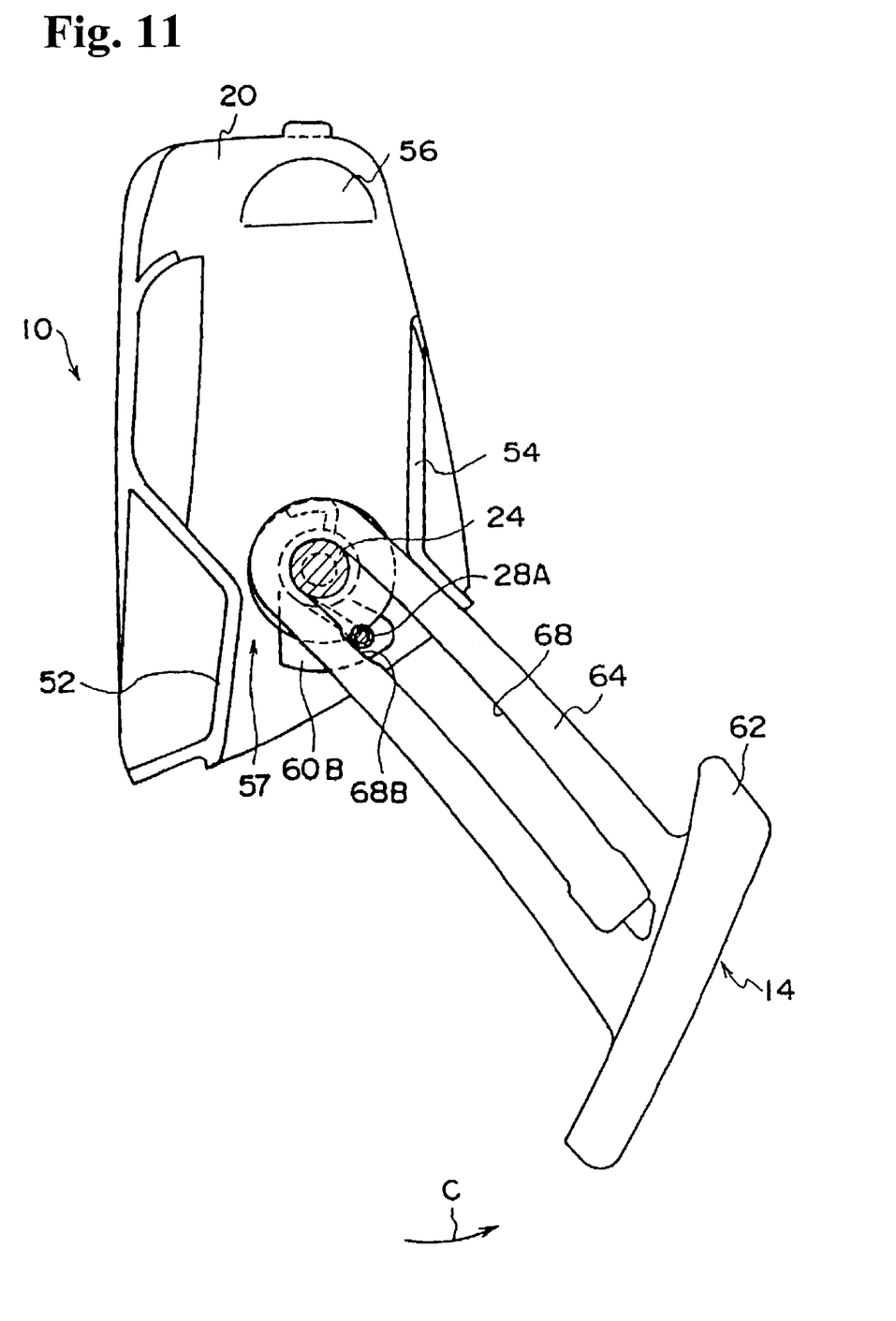
FIG. 11 is a plan sectional view for illustrating the manner in which the guiding position of the seat belt is changed by the sliding movement of the hanger, wherein the hanger is slid forward and swung in the taking-out direction of the seat belt.

Also, in case the hanger 14 is located at the position as shown in FIG. 10 and the seat belt 104 is strongly pulled, the hanger 14 is swung in the direction indicated by arrow C as shown in FIG. 11 to thereby absorb forces applied to the respective portions of the seat belt guide 10. Therefore, the seat belt guide 10 is prevented from being broken.

As described above, in the seat belt guide 10 according to the embodiment, the hanger 14 for guiding the upper end 104A, i.e. the end in the vicinity of a shoulder of the passenger 110, of the seat belt 104 can be moved in a front-to-rear direction of the rear seat 102 to thereby change the guiding position. Moreover, when the hanger 14 is slid forward by a predetermined distance, the rear end of the sliding groove 68 engages with the bolt 24 to thereby swing the hanger 14 in a horizontal direction, and since the seat belt 104 is urged by the spring 32 to a side opposite to a direction in which the seat belt 104 is withdrawn from the belt passing opening 66 when the seat belt 104 is attached to the passenger, even if the passenger 110 of small build wears the seat belt, the seat belt 104 is not wound round the shoulder of the passenger and the seat belt 104 adjusted to a lower attaching height can be attached to a proper position.

Also, in the present embodiment, the main portion 12 is provided with the opening 34 at the front end surface thereof and the hanger guiding portion 57 formed in an approximately hollow shape extending from the opening 34 rearwards. Also, a device for moving the guiding position of the seat belt 104 is formed of the hanger 14 to be inserted into the hanger guiding portion 57 and slid in the front-to-rear direction, and the guiding portion 62 disposed at the front end of the hanger 14 and provided with the belt passing opening 66 for inserting the seat belt 104 through the same. Thus, the present invention can be produced small at a low cost without using a complex structure.

Further, in the embodiment described, the cylindrical portion 28A is located in the hanger guiding portion 57 of the main portion 12, and the hanger 14 is provided with the depressed portion 68B to be engaged with the cylindrical portion 28A at a position where the hanger 14 is slid forward by a predetermined distance, so that the seat belt can be held at a desired guiding state with a simple structure.

The seat belt guide according to the invention as described above can be adjusted according to a build of a passenger and attached to a proper position of the passenger.

While the invention has been explained with reference to the specific embodiment of the invention, the explanation is illustrative and the invention is limited only the appended claims.

What is claimed is:

1. A seat belt guide for guiding a seat belt in a vehicle, comprising:

mounting means to be fixed to the vehicle and having a main portion to be mounted to the vehicle, said main portion including an inserting portion having an opening in a front end surface thereof and a hollow portion extending rearward from said opening, and a movable guide slidably attached to the mounting means for engaging and guiding the seat belt and including a sliding member inserted into the inserting portion to be slid in a front-to-rear direction relative to the mounting means, and a guiding portion disposed at a front end of said sliding member and having an inserting opening for receiving and guiding the seat belt therethrough, said movable guide moving in the front-to-rear direction to change a length of the guiding portion to the front end surface to thereby change a guiding position of the seat belt.

2. A seat belt guide as claimed in claim 1, wherein said inserting portion comprises a first engaging portion and said sliding member comprises a second engaging portion to be engaged with said first engaging portion at a position where the sliding member is slid forward by a predetermined distance.

3. A seat belt guide as claimed in claim 1, further comprising:

a supporting shaft mounted in said inserting portion and extending in a generally vertical direction at right angles with a sliding direction of said sliding member;

an engaging portion provided at a rear end of said sliding member to be engaged with said supporting shaft at a position where the sliding member is slid forward by a predetermined distance to thereby allow the sliding member to be swung around the supporting shaft; and biasing means for urging the sliding member to a side relative to the front-to-rear direction at least in a state that the sliding member is slid forward.

4. A seat belt guide assembly for guiding a seat belt in a vehicle, comprising, a guide support housing mounted on the vehicle;

an elongated slide member slidably mounted in said housing for sliding movement between an extended position in which one end projects forwardly away from said housing and a retracted position in which said one end is located close to said housing;

a belt engaging guide member mounted on said one end for movement therewith; and retaining means situated in said housing for engaging and releasably retaining said slide member in said extended and retracted positions so that said belt engaging guide is selectively mounted in a fore-and-aft direction.

5. A seat belt guide assembly defined in claim 4, wherein said retaining means further comprises pivot means permitting limited lateral pivoted movement of said slide member in said extended position.

6. A seat belt guide assembly defined in claim 5, further comprising biasing means normally urging said slide member in one pivoted direction.

* * * * *